United States Patent Office 2,709,173
Patented May 24, 1955

2,709,173

OXIDATION OF OLEFINS AND CATALYST THEREFOR

Alfred S. Brengle, El Sobrante, and Harold R. Stewart, Point Reyes Station, Calif., assignors to California Research Corporation, San Francisco, Calif., a corporation of Delaware No Drawing. Application January 9, 1950,
Serial No. 137,672

2 Claims. (Cl. 260—348.5)

This invention relates to the preparation of olefin oxide by the direct oxidation of the corresponding olefin in the presence of a catalyst composition. More particularly, this invention pertains to the direct oxidation of low molecular weight olefins, using a novel silver catalyst composition to obtain the corresponding olefin oxides.

Various methods have been employed to control the oxidation of olefin hydrocarbon in the presence of catalysts to increase the yields of olefin oxide and avoid substantial production of carbon dioxide. Many of these methods have proposed the use of silver catalyst in combination with promoters such as copper, gold, iron, manganese, etc., to enhance the yields of oxidized olefin. This particular means of controlling the oxidation, however, does not cut down on the accompanying formation of by-products such as carbon dioxide to any substantial degree, and is therefore not entirely satisfactory. Other types of oxidation promoters than the above, such as the hydroxides, oxides and peroxides of barium, strontium, and lithium, have also been utilized in silver catalyst compositions to control the oxidation of olefins to the corresponding olefin oxides. These, too, have been found to be of insufficient effect in suppressing the amount of carbon dioxide by-product. In addition to using silver-oxidation-catalyst promoters the prior art has endeavored to control the oxidation reactions by treating the silver catalyst with a so-called "repressant" such as ethylene dichloride, chlorine, sulfur chloride, etc. This method has the disadvantage of requiring an added step in the catalyst preparation and has not been altogether satisfactory.

It has been found that olefin oxides may be produced in surprisingly improved yields, while at the same time inhibiting the formation of carbon dioxide by oxidizing the olefins in the presence of a silver surface catalyst produced by a process which comprises combining a compound of silver decomposable to active silver and an alkali metal halide with a catalyst carrier, said catalyst composition then being heated to decompose the silver compound. A preferred combination includes a silver-oxidation-catalyst promoter.

The silver compounds, according to this invention, may be any of those known to the art to be capable of forming silver surface catalysts. Silver oxides, as well as organic silver compounds which on being heated decompose to form finely-divided active silver material are contemplated by this invention. Such silver organic compounds are illustrated by the silver salts of organic acids such as formic, acetic, propionic, etc. In addition to the silver salts of the monobasic acids, the silver derivatives of dibasic acids such as oxalic, maleic, etc., are suitable for this invention. Although all of the preceding examples of silver compounds are applicable to this invention, the silver oxides and peroxides are more desirable, with the silver oxide being preferred for our purposes. The silver compound may be used in a wide range of proportions, depending on the type of carrier that supports it and its expected life under the operation conditions for the process. Usually about five to fifty per cent of silver compound based on the weight of the carrier is desirable, while proportions of about twenty-five per cent are preferred.

Although the preferred catalyst composition contains a separate promoter it is not always necessary since during the preparation of the catalyst the alkali metal halide may be converted to some extent to the corresponding alkali metal oxide which acts as a promoter. The silver-oxidation-catalyst promoter, when used, can be any one of the great number known to the art. They may be used as a single compound or more than one of the compounds may be incorporated in the catalyst composition. Examples of these compounds suitable for the invention are the oxides, hydroxides and peroxides of barium, lithium and strontium. Although all of the preceding are desirable for the preparation of the catalyst composition according to this invention, barium peroxide is preferred. These oxygen-containing compounds can be used in any proportions up to about fifty per ecnt by weight, based on the silver compound present in the catalyst composition. However, it is usually preferred that the proportions be in the range from about two to fifteen per cent.

Any of the alkali metal halides such as lithium, sodium, potassium and rubidium compounds of chlorine, bromine and iodine generally are suitable for this invention. The lithium halides are especially desirable, with lithium bromide being preferred. The alkali metal halide can be used in any proportions sufficient to produce the optimum conversion of olefin to olefin oxide. Usually very small amounts of less than about 0.5 per cent are desirable. Proportions of alkali metal halide within the range of from about 0.0001 to about 0.1 per cent are still more preferred. About 0.02 per cent was used in the experiment set out in the example which follows. All of the preceding proportions are by weight based on the amount of silver compound used in preparing the catalyst.

The catalyst composition can be prepared by combining the above ingredients and heating to any temperature sufficient to substantially decompose the silver compound to its active silver form. Any temperature below sintering temperature and in excess of 250° F. is suitable; however, those temperatures falling in the range from about 300° F. to 600° F. are ordinarily utilized. Temperatures between about 500° F. and 600° F. are preferred. The heating operation is continued for a period of time sufficient to decompose the silver compound to active silver. Usually from about 30 minutes to about 6 hours is required. It is usually convenient to conduct the decomposition in the presence of air, although other gases are suitable. Inert gases such as nitrogen can be used under more exacting conditions, but are not considered essential to the invention. The catalyst can be prepared under any practical pressure conditions, either atmospheric, subatmospheric or superatmospheric. However, for most purposes atmospheric conditions of pressure are found to be more practical.

The olefins to be oxidized according to the process of this invention can be obtained from various sources. They may be in the form of pure olefins, mixtures of olefins, or hydrocarbon mixtures containing olefins. Substantially pure olefins are utilized in the preferred process. The lower molecular weight hydrocarbon olefins in particular are adaptable to this invention. Those which are normally gaseous, such as ethylene, propene, butene-1, butene-2 and butadiene, for example, are more suitable, with ethylene being preferred.

The conditions for the preparation of olefin oxides according to this invention are those conventional in the art of directly oxidizing olefins using silver catalysts. Any of the temperatures, pressures, and catalyst space rates that are commonly used in this type of operation are adapted to the present process. The olefin and the oxidizing agent such as air, oxygen or ozone may be present in all proportions. The best yields per pass are obtained when the olefin is in minor proportions. The most satisfactory proportions are found to be from about two to twenty per cent of olefin in the olefin and oxygen-containing mixture. Around five per cent olefin is preferred when air is used as the oxidizing element. The space rate and temperature of the process are interrelated and vary over a wide range depending on the catalyst condition and the degree of conversion desired. Ordinarily the catalyst space rate will be from about 150 to about 3600 volumes of gaseous mixture per volume of catalyst per hour, the volume of gas being measured at 60° F. The temperature, which, as already stated, depends on the particular space rate utilized, may vary considerably since any temperature at which oxidation will occur is suitable. Usually temperatures in excess of 300° F. are the more practical, and those within the range of from about 300° F. to 750° F. are preferred. Temperatures of around 500° F., as illustrated in the example which follows, provide excellent results. The reaction pressure may also be varied over a wide range depending on the type of olefin being oxidized and the limitations of the equipment utilized. Ordinarily it is desirable that the pressure be maintained at a level whereby the olefin is permitted to remain in a gaseous state during the oxidation. It may be either atmospheric, superatmospheric or subatmospheric, but for practical reasons substantially atmospheric pressures are generally preferred.

The following two examples serve to illustrate the superiority over the prior art that is inherent in the process of the present invention using a silver surface catalyst prepared according to the novel method described in the preceding paragraphs. In Example 1, a conventional process of olefin oxidation utilizing the conventional type of silver catalyst is depicted, while in Example 2, a process within the scope of this invention is described. The invention, however, is not restricted to this latter example.

*Example 1*

Approximately 100 cc. of 12–16 mesh tabular alumina equal to about 160 grams in weight was washed with dilute nitric acid followed by distilled water. To this washed alumina was added 50.1 grams of silver oxide, 5.1 grams of barium peroxide and 225 cc. of distilled water. A slurry was formed which was then evaporated to dryness while stirring. This gave a mixture of catalyst and carrier wherein the catalyst was deposited as an adherent film on the surface of the carrier. About 100 cc. of this material was heated in a steel reactor in the presence of air at a temperature of about 500° F. for four hours. The silver oxide was thereby decomposed to active silver.

The catalyst composition thus prepared was allowed to remain in the reactor. Ethylene and air at a ratio of about nineteen per cent ethylene based on the air was passed through a reactor at a space rate of about 300 volumes of gas per superficial volume of catalyst. The pressure was substantially atmospheric and the temperature was maintained at about 475° F.

The maximum yield of ethylene oxide per pass using the above catalyst and reaction conditions was only about forty-two mol per cent.

*Example 2*

97 cc. of tabular alumina was prepared as a carrier by washing with dilute nitric acid and then with distilled water. This material was combined with 50 grams of silver oxide, 5 grams of barium peroxide and 0.01 gram of lithium bromide. The mixture was then covered with water and stirred. The resulting slurry was evaporated to dryness while stirring, leaving a film of catalyst adhering on the surface of the carrier. 100 cc. of the catalyst composition was placed in a steel reactor and heated to about 525° F. for one hour in the presence of air to decompose the silver oxide.

Ethylene and air in a ratio of about nineteen per cent ethylene were passed as a mixture through the reactor at a space rate of about 300 volumes of total gas at 60° F. per superficial volume of catalyst per hour. The temperature was maintained at about 465° F.

The yield of ethylene oxide per pass using the catalyst prepared according to this example was found to be about forty-eight mol per cent. Several runs under nearly constant conditions showed a decrease in the $CO_2$ found to indicate an ultimate yield of about fifty-five mol per cent. This amounts to an improvement in the yield of from about fourteen to thirty per cent over that obtained using the ordinary silver catalyst composition of Example 1.

Other modifications of the processes and compositions as described above are included within the scope of the invention as defined by the appended claims.

We claim:

1. A process of making ethylene oxide which comprises contacting a mixture of ethylene and free oxygen-containing gas at a temperature of from about 300 to about 750° F., a space velocity from about 150 to about 3600 volumes of gas per volume of catalyst per hour, and substantially atmospheric pressure with a silver surface catalyst consisting essentially of silver, from about 2 to 15% by weight based on the silver of barium peroxide and from about 0.0001 to about 0.1% by weight based on the silver of lithium bromide on an alumina catalyst carrier, said carrier being present in an amount sufficient to support the catalyst composition.

2. A silver surface catalyst for the oxidation of olefins consisting essentially of silver, from about 2 to 15% by weight based on the silver of barium peroxide and from about 0.0001 to about 0.1% by weight based on the silver of lithium bromide on an alumina catalyst carrier, said carrier being present in an amount sufficient to support the catalyst composition.

References Cited in the file of this patent

UNITED STATES PATENTS

| | | |
|---|---|---|
| 2,194,602 | Law et al. | Mar. 26, 1940 |
| 2,279,469 | Law et al. | Apr. 14, 1942 |
| 2,424,085 | Bergsteinsson | July 15, 1947 |
| 2,424,086 | Bergsteinsson | July 15, 1947 |
| 2,446,132 | Evans | July 27, 1948 |
| 2,615,900 | Sears | Oct. 28, 1952 |

OTHER REFERENCES

Berkman: "Catalysis," pp. 696–7, Reinhold Pub. Co. (1940).